D. PEPPER.
ELECTRIC BATTERY.
APPLICATION FILED NOV. 29, 1919.
1,375,012.
Patented Apr. 19, 1921.
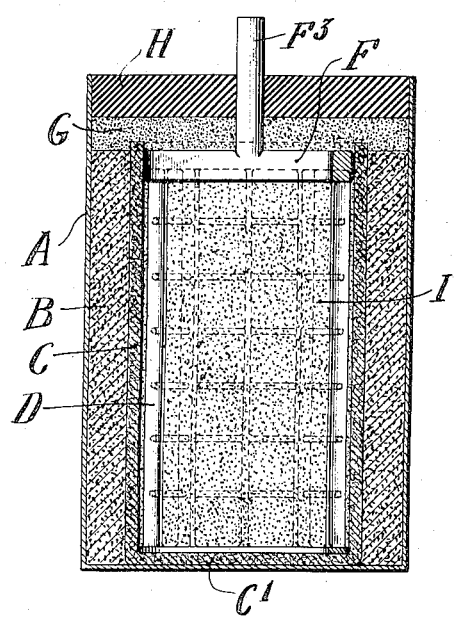
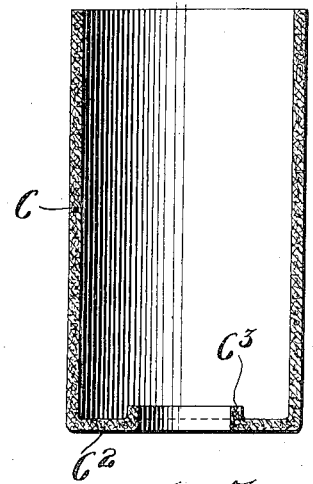
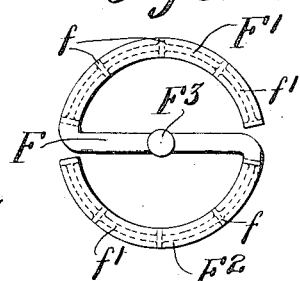
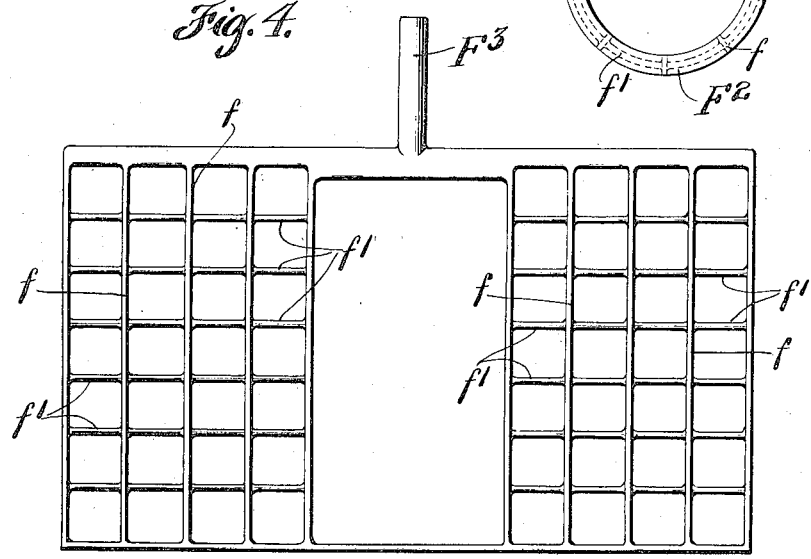
WITNESSES:
Gustav Genzlinger.
INVENTOR
David Pepper
BY
Francis J. Chambers
ATTORNEY

UNITED STATES PATENT OFFICE.

DAVID PEPPER, OF PHILADELPHIA, PENNSYLVANIA.

ELECTRIC BATTERY.

1,375,012.　　　　　　　Specification of Letters Patent.　　Patented Apr. 19, 1921.

Application filed November 29, 1919. Serial No. 341,499.

*To all whom it may concern:*

Be it known that I, DAVID PEPPER, a citizen of the United States of America, residing in the city and county of Philadelphia, in the State of Pennsylvania, have invented certain new and useful Improvements in Electric Batteries, of which the following is a true and exact description, reference being had to the accompanying drawings, which form a part thereof.

My invention relates to the construction of electric batteries, and more especially to the type of electric battery used for flash lights, although in certain features my invention would also have useful application to batteries used for other purposes, or even to storage batteries. The object of my invention is to provide a battery of simple and efficient construction which can be made at small cost and assembled with great ease and certainty.

The nature of my invention will be best understood as described in connection with the drawings in which I have illustrated a battery made in accordance with my invention in which—

Figure 1 is a sectional elevation of the battery.

Fig. 2 a sectional elevation of a somewhat modified absorbent and expansible cup separator used in connection with the battery.

Fig. 3 is a plan view of a lead grid which I preferably use in connection with my battery, and Fig. 4 is a face view of the casting which is bent into the lead grid form shown in Fig. 3 and the grids, of course, filled with active material.

The battery is made up of a container A, which, in my construction, consists of a cast cup of a lead antimony alloy containing, preferably, between three and six per cent. of antimony. This alloy forms the cup to be cast with thin walls, say from twelve to twenty thousandths of an inch in thickness, and while permitting the use of such thin walls the alloy also insures that the cup shall be sufficiently stiff and rigid to prevent easy deformation. This alloy also is not attacked by the electrolytes used, and is a good conductor and does not cause local action.

B is an annular layer of active material, which is pressed or pasted against the inner wall of the cup. This active material is preferably peroxid of lead acting as the positive electrode of the battery, and sufficient contact can be secured between the container and this active material without the formation of ribs or projections in the inner side of the container, which, of course, greatly simplifies the construction of the cup. C is a cup shaped separator formed of some absorbent and expansible material molded or otherwise formed into a cup, the cylindrical wall of which lies against the active material B and the bottom of which rests upon the bottom of the container cup. This separator cup can be formed by molding wood pulp, or similar material, into the form of a cup. The material must be such as will not be affected by the sulfuric acid used as an electrolyte and must not contain salts or compounds which would be injurious to the action of the battery. D is the inner electrode which may be formed in any convenient way, but, preferably, and for batteries of anything but the smaller sizes is formed by a lead grid made up, as shown in Fig. 3, and formed from a flat casting such as shown in Fig. 4, by bending the grids $F'$ or $F^2$ in opposite directions, as shown in Fig. 3. The two grids are united by a cross piece F, and from which extends a terminal located as indicated at $F^3$. The grids are made up of vertical ribs indicated at $f$, connected by horizontal ribs indicated at $f'$, but the active material is pressed or pasted in the grids by usual and well known methods.

The separator cup C must be made of such size and such material that it can readily be placed in position in the container cup after the active material B is in place and will also permit the ready insertion of the electrode D, while, at the same time, when the material in the cup is wet with the electrolyte it will expand into contact with both the inner and outer layers of active material and exert pressure upon both which may not be very great, though no harm would be done if the pressure was quite considerable. The function of the cup is not only to exert a certain pressure upon both the inner and outer electrodes but also to contain, and hold in contact with the electrodes, a sufficient amount of electrolyte to insure the efficient chemical reaction between the electrodes.

It is an important function of the cup that it acts as a mechanical and electrical separator between the two electrodes, and by carrying the walls of the cup inward at the bottom, as indicated at C', not only is the inner electrode prevented from coming in contact with the container cup, but also any particles which may become separated from the inner electrodes are prevented from contacting with the container. I indicates a filling, which, in the annular type of inner electrode is advisable, and this filling preferably may be of some absorbent material similar to that of the container cup and holding in contact with the inner walls of the inner electrode the electrolyte with which it is wet. G indicates a layer of sawdust, or any convenient material, which is placed on top of the electrodes and of the separator cup after the battery is filled and the electrolyte absorbed, the object being to allow for expansion, and the battery is sealed in the usual manner with a sealing compound, for instance, asphalt, as indicated at H. The terminal lug $F^3$ of the inner electrode extends through the sealing layer, and, in the construction shown, comes in the center of the cylindrical bearing where it is most conveniently placed.

While I believe it is most convenient to form the separator cup C with a flat and continuous bottom as indicated at C', it may also be formed as indicated in Fig. 2, with the bottom portion $C^2$ extending inward for a certain distance, sufficient to underlie the inner electrode B, and, preferably, with its inner edges turned up as indicated at $C^3$.

While I prefer to form the separator cup by molding it from such material as I have referred to it must be understood, and it will be obvious, that it could also be formed by folding sheets of material, such as blotting paper, into the form of the container cup.

Having now described my invention, what I claim as new and desire to secure by Letters Patent, is:

1. A battery comprising a container, active material contacting with the inner wall thereof, a cup formed of absorbent and expansible pulpy material set in the container so as to contact with the active material and extend over a portion of the bottom of the container, and a core of active material contacting with the inner wall and bottom of the cup, said cup being made of such thickness that when wet with electrolyte its expansion will exert pressure against the walls of active material between which it lies.

2. A battery comprising a thin walled cup shaped container cast from an alloy of lead and antimony, a layer of active material contacting with the inner wall thereof, a core of active material and an absorbent material filling the space between the outer layer and core of active material.

3. A battery comprising a container, active material contacting with the inner wall thereof, a lead grid formed of two sections bent in opposite directions to conform to the shape of the container and united by a cross piece at the top formed with a conducting lug springing from its center, said segments having active material attached to them and constituting the inner electrode of the battery, and absorbent material separating the inner and outer electrodes.

DAVID PEPPER.